United States Patent [19]

Misra et al.

[11] Patent Number: 5,093,092
[45] Date of Patent: Mar. 3, 1992

[54] PURIFICATION OF BAYER PROCESS LIQUOR WITH ALUMINA COATED WITH A LAYER OR CARBON

[75] Inventors: Chanakya Misra, Plum Borough; Joseph R. Genito, Lower Burrell, both of Pa.

[73] Assignee: Aluminum Company of America, Pittsburgh, Pa.

[21] Appl. No.: 661,612

[22] Filed: Feb. 28, 1991

[51] Int. Cl.$^5$ .............................. C01F 1/00
[52] U.S. Cl. .................... 423/130; 423/112; 423/121; 423/122; 423/600
[58] Field of Search ............ 423/121, 122, 130, 600, 423/625, 129, 112

[56] References Cited

U.S. PATENT DOCUMENTS

| | | | |
|---|---|---|---|
| 1,699,108 | 4/1902 | Hunt | 423/29 |
| 3,002,809 | 10/1961 | Walker | 23/52 |
| 3,457,032 | 7/1969 | De la Breteque | 23/52 |
| 3,811,916 | 5/1974 | Russell et al. | 423/136 |
| 3,832,442 | 8/1974 | Emerson | 423/111 |
| 4,275,043 | 6/1981 | Gnyra | 423/130 |
| 4,496,524 | 1/1985 | Bush et al. | 423/121 |
| 4,676,959 | 6/1987 | The et al. | 423/130 |

*Primary Examiner*—Theodore Morris
*Assistant Examiner*—Edward Squillante
*Attorney, Agent, or Firm*—Glenn E. Klepac

[57] ABSTRACT

An economical process for the removal and destruction of organic impurities present in Bayer process liquor depends upon the use of a hybrid adsorbent. The hybrid adsorbent consists essentially of porous essentially anhydrous particles of alumina having deposited on the surfaces thereof including the pores, an ultrathin layer of carbon atoms which is essentially monomolecular. Such carbonization is effected by cracking a suitable hydrocarbon, preferably a gas, in contact with a hot turbulent fluidized bed of alumina particles. This layer has the unique property of adsorbing far more impurities than the equivalent weight of active carbon, and also oxalate ions which are known not to be adsorbed on carbon. As an ultrathin layer it is too thin to change either the average pore volume or the surface area of the alumina particles substantially, from before they are carbonized. Because a sidestream of hot calcined alumina product is withdrawn from the main processing plant, the sidestream may be carbonized with a minimum energy cost. After virgin carbonized alumina adsorbs impurities and is "spent", the spent alumina is returned to be calcined and can either be recarbonized, or sold as smelting grade alumina.

8 Claims, 3 Drawing Sheets

PURIFICATION OF BAYER PROCESS LIQUOR WITH ALUMINA COATED WITH A LAYER OR CARBON

BACKGROUND OF THE INVENTION

Over the past century since it was first commercially used, the Bayer process has become the process of choice for extracting aluminum hydroxides from bauxite because it is economical for bauxites containing 30–60% $Al_2O_3$ as aluminum hydroxides and less than 7% $SiO_2$ as clay (kaolin) minerals. Except for the most exiguous applications, purchasers of the recovered aluminum hydroxides have voiced continuing objections to the physical characteristics attributable to impurities, mainly organic, which inevitably were inculcated in the recovered aluminum hydroxides due to the inability to remove the organic impurities essentially completely. Chief among the objections are those of "color", typically to offwhite or reddish-brown crystals of aluminum hydroxide, and to the presence of oxalate (typically an alkali metal oxalate such as sodium oxalate, because sodium hydroxide is used in the Bayer process) in the aluminum hydroxide.

The objections to color are not only cosmetic because the aluminum hydroxide crystals are often used in "white" products, or in colored products where the introduction of yet another color is undesirable, but also because of the chemical contribution of sodium oxalate towards upsetting the chemistry of a process in which the aluminum hydroxide is used. Further, calcination of the aluminum hydroxide results in smelting grade alumina having a residue of sodium oxides, adding to the level of sodium in alumina. High levels of sodium are undesirable in smelting grade alumina.

Since sodium oxalate is inevitably formed in the digestion of commercially available bauxite ore, and sodium and oxalate ions remain in the filtered Bayer process liquor from which the aluminum hydroxide is precipitated, some of the oxalate ions always remain in commercially produced aluminum hydroxide. If the concentration of sodium oxalate in the process liquor is high, it crystallizes in the crystallization zone of the Bayer process and adversely affects the precipitation of aluminum hydroxide. Sodium oxalate in the aluminum hydroxide crystals causes them to crack, creating undesirable fines. The object is to decrease the concentration of sodium oxalate in the crystals, preferably by preventing its precipitation in crystalline form, and to do so economically. It is therefore of great commercial significance, economically to effect even a small decrease in the level of sodium oxalate in aluminum hydroxide.

Apart from cosmetic considerations, dissolved, microscopic and submicroscopic organic materials left in the sodium aluminate solution get incorporated into the aluminum hydroxide during its precipitation. In the past, efforts to remove these impurities included using activated carbon which effectively adsorbs them. However, the cost of recovering the active carbon for reuse makes the process uneconomical, and the cost of simply disposing of the contaminated active carbon even more so.

To this day, there is not a single known instance of an economical purification process for Bayer liquor being practiced commercially. The problem of doing so economically is an age-old one. All the known processes for satisfactorily purifying Bayer process liquor are relatively expensive, and the quest for an effective but economical process continues unabated. The economic problem is that purchasers balk at the inclusion of the cost of purifying Bayer process liquor by any known means in the price of "white" aluminum hydroxide. The cost of carbonizing available smelting grade alumina product to make a hybrid adsorbent (so termed because it is a combination of two known adsorbents, alumina and carbon) is relatively low. The ability to calcine contaminated (or "spent") adsorbent economically, then either to use it as on-spec smelting grade alumina, or recycle the calcined product to be carbonized for reuse as hybrid adsorbent, allows the use of a large quantity of the adsorbent. Since the more adsorbent used, the more effective it is, high efficiency of the product is obtained without a corresponding increase in cost. At the same time, use of the hybrid adsorbent provides a solution to the problems associated with using a mixture of separate and distinct particles of activated alumina and active carbon, then separating the spent mixture and recovering each component in a form suitable for remaking the mixture for reuse.

The Bayer process may be summarized as follows: Bauxite ore is digested with 10% to 30% by weight (wt) aqueous NaOH solution in the range from 100°–300° C. with agitation to disperse and maintain the bauxite in a suspension. After decantation and sedimentation to remove bauxite residue, the liquor produced has a specific gravity ranging from 1.1 to 1.5, preferably from 1.2 to 1.3. Crystals of aluminum hydroxide are precipitated from this liquor after it is further filtered and cooled.

To minimize the color which is imparted to these crystals, the liquor has been diluted with water to a specific gravity in the range from 1.2 to 1.25, and a carbonaceous filter aid added in an amount from 0.5% to 1% by wt of the liquor prior to the liquor being filtered. In this process, described in U.S. Pat. No. 3,002,809 to Walker, the filtrate obtained with any good grade of filter carbon as the filter aid, is still dark amber in color and still contains organic coloring matter which must be bleached. The bleached liquor is then conventionally processed to yield high purity crystals.

The cost of using a carbon filter aid, even if it were sufficiently effective to avoid bleaching the liquor obtained, appears to have been economically unacceptable even at about the time of the '809 disclosure. The amount of liquor to be treated before the aluminum hydroxide is precipitated, and the amount of carbon required to do so, are both too large. The cost of disposing of the contaminated cabon black is too high.

The process disclosed in U.S. Pat. No. 3,457,032 to de la Breteque, sought to avoid using a filter aid by flowing the liquor over an anion exchange resin, but was not commercially viable. Still other processes suggesting the use of complexing agents to remove metallic impurities, and α-methyl cellulose to remove organic impurities fared no better in the marketplace.

A recent process disclosed in U.S. Pat. No. 3,832,442 to Emerson, to improve the color of Bayer process liquor, teaches mixing it at a temperature in the range from 40° C.–90° C. with an active alumina having a surface area of at least 50 $m^2/g$ to remove both metallic ion, and, undesired color bodies, simultaneously. The active alumina used does not lose more than 30% of its weight by dissolution in the alkali aluminate liquor during contact in that temperature range. Such active alumina is characterized by: loss on ignition (at 1000° C. for 1 hr) less than 25 by wt, an average pore volume of at least 0.2 cc/g and an alumina content of at least 50% by wt.

In a still more recent process disclosed in U.S. Pat. No. 4,275,043 to Gnyra, there is disclosed a process particularly directed to the removal of sodium oxalate from spent Bayer process liquor from which aluminum hydroxide has already been precipitated and separated. In this process, the concentration of sodium oxalate is built up to a supersaturated level, and treated with activated alumina, activated carbon or activated clay adsorbents to remove only a small portion of the humic matter present, not more than 0.5 gm/liter (as organic carbon) of humic matter. The liquor is thus destabilized and allows the sodium oxalate to be precipitated, preferably by seeding with sodium oxalate crystals, optionally in the presence of flocculating agents. Gnyra teaches that the humic matter keeps the sodium oxalate in solution, and that if the humic material is removed, precipitation of the sodium oxalate is stimulated. Typically the quantity of sodium oxalate precipitated is several times as large as the amount of humic matter removed from the liquor. He does not teach that sodium oxalate is removed by being adsorbed on the surface of the activated alumina as did Emerson.

Since precipitating the sodium oxalate was the primary goal by decreasing the amount of humic matter, it is readily seen why only activated carbon is illustrated in the examples. Activated carbon is known to be effective to remove humic matter but is inactive for the removal of sodium oxalate. Yet, in my hybrid adsorbent, the adsorption characteristics of which, for color-forming organic impurities, are similar to those of active carbon, because of the uniform distribution of the monomolecular layer of carbon over the surfaces of the pores, the hybrid adsorbent surprisingly also adsorbs oxalate.

The specific carbon illustrated by Gnyra has a particle size in the range from $-8$ to $+30$ mesh (U.S. Standard), a specific surface area of about 600 $m^2/g$ and a bulk density of about 0.35 g/cc (22 $lb/ft^3$). Clearly, the effectiveness of the activated carbon is due to the porosity of the carbon particles. The process of my invention cannot benefit from the porosity of the layer of carbon I deposit on the alumina I use, because the layer of carbon is essentially monomolecular.

It will be evident that the ability of activated alumina to remove organic matter inures to the benefit of carbonized alumina, but the presence of the ultrathin layer of carbon on the surface of the smelting grade alumina I use, allows the carbon to function as if it was a large porous mass, and provides my novel material with the unexpected property of being able to remove a far greater amount of impurities from the process liquor than one might be led to expect from knowledge of the activity attributable to a given amount of either component, by itself.

SUMMARY OF THE INVENTION

It has been discovered that essentially anhydrous smelting grade alumina product of the Bayer process may be coated utilizing a novel process comprising, fluidizing the alumina in a turbulent fluid bed at a temperature in the range from about 500° C.–950° C.; contacting the fluidized alumina with a predetermined amount of hydrocarbon gas in the presence of a controlled amount of oxygen for a period of time sufficient to deposit carbon atoms in an ultrathin, essentially unbroken monomolecular layer of carbon essentially free of volatile matter over the entire surface area of the alumina particles without substantially changing the average pore diameter of the alumina or its pore volume; and, recovering carbonized smelting grade alumina in a free-flowing particulate form having better adsorptive properties for organic impurities in Bayer process liquor, than those of either the uncarbonized alumina, or active carbon in an amount equivalent to the weight of carbon deposited on the alumina. By "without substantially changing the average pore diameter of the alumina or its pore volume" I refer to a change of less than about 5%.

It has also been discovered that discrete particles of porous, essentially anhydrous smelting grade alumina, having a pore volume in the range from about 0.1–1.0 cc/g, preferably from 0.1 to 0.5 cc/g, after being coated with an ultrathin layer of carbon less than 10 Å thick, preferably less than 5 Å thick, so as to have an average carbon content of less than 10% by wt (based on the carbonized alumina), preferably less than 5% by wt, may be used as a hybrid adsorbent, simultaneously, effectively to purify process liquor containing both sodium oxalate and color-forming impurities by adsorption thereof in the pores of the carbonized alumina's surface.

It is therefore a general object of this invention to provide a porous, carbonized, essentially anhydrous smelting grade alumina product generated from aluminum hydroxide produced in the Bayer process, which alumina is used to trap organic impurities including color-forming impurities and alkali metal oxalate in the pores of the carbonized alumina, the surface area of which is coated with such an ultrathin unbroken non-porous layer of carbon atoms as not to substantially decrease the average pore volume of the alumina. The carbonized alumina, contaminated with organic material, is separated from the purified process liquor. The "spent" alumina separated is recycled to calcination, and returned to be carbonized for reuse as the virgin adsorbent without substantially increasing the level of sodium in the alumina. By "without substantially increasing the level of sodium in the alumina" I refer to an increase of less than about 1%.

It is also a general object of this invention to provide a process for producing a desirably color-free alumina, depleted in sodium oxalate which is not crystallized with the aluminum hydroxide, comprising, contacting Bayer process liquor at ambient pressure and a temperature in the range from about 20° C. to about 100° C., with a mass of discrete particles of porous alumina coated with an essentially monomolecular layer of carbon. This carbonized alumina is essentially insoluble in hot alkaline process liquor. After effectively adsorbing both oxalate ions and color-forming organic impurities from the Bayer process liquor, the contaminated alumina is separated from the process liquor, then calcined to remove the adsorbed impurities, and returned as on-spec smelting grade alumina product. Because the contaminated alumina is converted to on-spec product it is practical to use a large amount, up to 40% by wt of the process liquor being treated, preferably from 10%–20% by wt, of carbonized alumina in the purification process.

It is a specific object of this invention to provide a process for purifying Bayer process liquor using a hybrid adsorbent of porous smelting grade alumina coated with less than 5% by wt carbon, which hybrid adsorbent allows one to adsorb alkali metal oxalate not otherwise adsorbable on active carbon, as well as other organic impurities; calcine away adsorbed impurities from the "spent" adsorbent; and, recycle the calcined adsorbent. After calcination of the contaminated "spent" adsorbent, it is indistinguishable from virgin smelting grade alumina product.

It is another specific object of this invention to provide a process for purifying Bayer process liquor using an essentially anhydrous alumina adsorbent having less than 1.0%, preferably less than 0.5% LOI (loss on ignition), a surface area (measured by BET $N_2$ adsorption, *Jour. Am. Chem. Soc.* Vol 60, pp 309-319) in the range from 25-250 $m^2/g$ and an average pore size in the range from 20 Å to 250 Å. The alumina is coated with carbon atoms in an essentially unbroken layer less than 10 Å thick.

It is still another specific object of this invention to provide a porous smelting grade alumina coated with carbon atoms deposited in an essentially monomolecular unbroken and non-porous layer by a method which deposits the carbon atoms essentially evenly over the surface area of the alumina, and which layer remains tightly held to the surface of the alumina during agitation with a hot sodium aluminate solution having a total caustic content in the range from about 150-250 g/L, measured as $Na_2CO_3$; total $Na_2CO_3$ in the range from about 175-275 g/L, measured as $Na_2CO_3$; $Al_2O_3$ in the range from about 50-200 g/L; and a ratio of $Al_2O_3$:total caustic in the range from about 0.3-0.7.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF A PREFERRED EMBODIMENT

Figure 1:
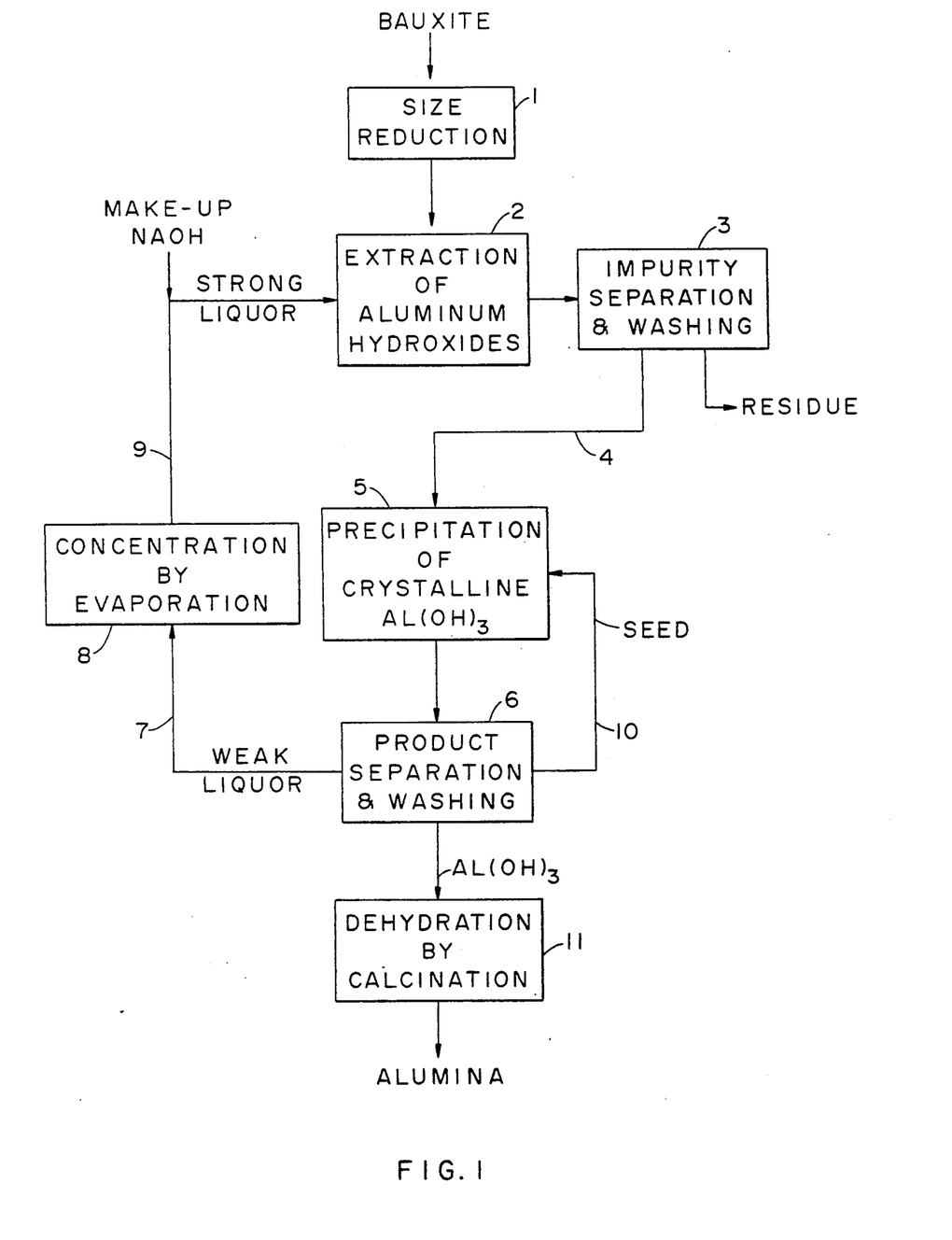
FIG. 1 is a process flowsheet of the Bayer process, schematically illustrating the main steps for recovering aluminum hydroxide and alumina from bauxite ore.

The main steps of the Bayer process are schematically illustrated in FIG. 1 which shows the process flow of bauxite which is first comminuted in a size reduction zone 1, before the crushed bauxite is fed to an extraction zone 2, where aluminum hydroxides are extracted from the bauxite by the action of hot caustic (NaOH) solution. Digestion is typically effected in continuously operated steam-heated autoclaves combined with heat recovery systems. The particular conditions of extraction depend upon the type of alumina minerals in the bauxite. Gibbsite is extracted at lower temperature ($\approx 150°$ C.) and caustic concentration ($\approx 200$ g NaOH per liter of water or g/L NaOH) than boehmite or diaspore which require higher temperatures and caustic concentrations. The aluminum hydroxides are converted to $NaAlO_2$.

Bauxite residue, which includes oxides of iron, titanium and silicon is separated by decantation and filtration in an impurity separation and washing zone 3. Primary separation of the bauxite residue (solid impurities) is effected by decantation in large-diameter thickener tanks in zone 3.

The decanted caustic aluminate liquor is further filtered to remove suspended solids, for example, in a Kelly type filter (also in zone 3) from which filter flows a cooled (60° C.-70° C.) supersaturated solution 4 into a crystallization zone 5 where crystalline aluminum hydroxides (gibbsite) are precipitated on seed crystals of gibbsite.

Precipitation is carried out in large tanks over a period ranging from 30 hr to about 100 hr. It is during this step that organic impurities such as complexes of the humic acids, which impart color to the crystals, are incorporated into the crystals. Also present in the crystals are sodium salts of any acidic materials which may be present, particularly sodium oxalate. The precipitated crystals are filtered and washed in a product separation and washing zone 6. The precipitated aluminum hydroxide crystals are conventionally separated from the process liquor by filtration in a rotary vacuum filter, settling in settling tanks, or centrifugal force, or combinations thereof in zone 6.

Weak liquor 7 is concentrated by evaporation in a concentration zone 8, and the concentrate, strong liquor 9, recycled to the extraction zone with the addition of make-up NaOH. Some of the precipitated aluminum hydroxides 10 is used for seeding the preciptiation tanks in the crystallization zone 5. The washed aluminum hydroxide is dried for chemical products or calcined to metallurgical-(aluminum smelting) grade alumina in the dehydration zone 11.

The typical aluminum hydroxide obtained from the Bayer process is off-white, crystalline trihydroxide gibbsite $Al(OH)_3$ in a primary particle size ranging from 5 micrometers (or microns $\mu$) to 180$\mu$ in roughly spherical agglomerates of hexagonal prisms and rods. The amount of color depends upon the amount of organic impurities incorporated in the crystals.

The smelting grade alumina with the physical properties specified hereinabove is essentially insoluble (less than 5% by wt) in hot process liquor at a temperature in the range from 60°-90° C. and pH 14, and becomes even less soluble after the alumina is carbonized.

The particular method for carbonizing the alumina so as to deposit the essentially unbroken monomolecular layer of carbon containing essentially no volatile matter, within its pores and over substantially its entire surface, is not narrowly critical provided the layer is less than about 10 Å, preferably less than 5 Å thick.

Figure 2:
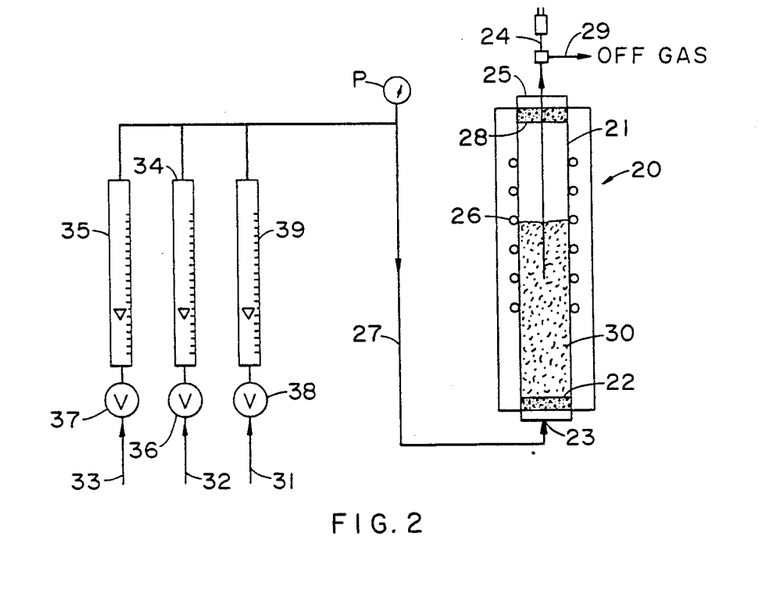
FIG. 2 is a schematic illustration of a laboratory apparatus for depositing the requisite ultrathin film of carbon on the surface of porous alumina particles.

A preferred method for carbonizing the alumina in a carbonization reactor on a laboratory scale is described in conjunction with FIG. 2, as follows:

A weighed quantity of smelting grade alumina having a loss on ignition LOI of less than 1.0% by wt, is placed in a 1" (inch) diameter stainless steel 316 tube 21 of a carbonization reactor indicated generally by reference numeral 20. An Inconel tube is used for temperatures above 800° C. The tube 21, about 20" long, is provided near its bottom with a porous stainless steel distributor plate 22 plugging the tube just above the bottom inlet 23 through which nitrogen, air and a crackable hydrocarbon such as an alkane, alkylene or alkadiene gases are to be introduced. A thermocouple 24 inserted through the upper closed end 25 of the tube and connected to a temperature recording device (not shown) to monitor the temperature.

An assembly of plural tube furnaces 26 is used to heat the furnace to the required temperature in the range from 580° C.–950° C. Sufficient nitrogen gas is admitted through a line 27 into the inlet 23 of the tube 21 to maintain the alumina particles 30 therewithin in a turbulent state. It is preferred to maintain the bed at the upper region of the turbulent zone since the particles can be contained by a porous refractory filter plug 28 in the upper portion of the tube if the bed makes a transition to the transport zone. Gases from the tube leave through outlet 29.

A controlled flow of the hydrocarbon gas, e.g. butadiene through line 31 is started after the fluid bed within tube 21 reaches constant temperature conditions with a simultaneous flow of air (if any is desired) through line 32. A nitrogen line 33 is also provided. The air and nitrogen lines 32 and 33 respectively are connected to flow meters 34 and 35 through flow control valves 36 and 37 respectively. The rate of flow of crackable hydrocarbon gas is similarly connected through flow control valve 38 and flow meter 39 to the inlet 23 and the flow is just sufficient to provide the aforespecified ultra-thin layer of carbon on the surface of the alumina particles.

The most preferred pressure, monitored with a pressure gauge P, and precise rate of flow is determined by trial and error depending upon the particular characteristics of the alumina, the temperature at which the carbon is deposited, and the specific hydrocarbon introduced. All flows through the flow meters 34, 35 and 39 for each of the gases are then adjusted to obtain the chosen flow rates.

The gases are preferably introduced after they have been thoroughly dried over a suitable desiccant in driers (not shown) to lower the moisture content to less than 100 ppm. Steady conditions are maintained for the required duration of each run made (usually 4 hr). Flow of the hydrocarbon gas (say, butadiene) is discontinued at the end of the run. The system is flushed with nitrogen for 10–15 min, the power to the furnace switched off, and it is allowed to cool overnight. The product is removed from the tube and analyzed. The results for numerous runs are set forth in Table 1.

In each of the runs except the first, the smelting grade alumina used has a surface area of 99 m$^2$/g, a pore volume of 0.224 cc/g, and an average pore size of about 92$\mu$. In each run a charge of 40 gm of alumina was fluidized at slightly more than atmospheric pressure, using 85 cc/min of N$_2$, and the flow of each hydrocarbon gas was maintained constant at 10 cc/min. Each run lasted for 4 hr. The fluidization and carbonization may be carried out at elevated pressure in the range from 1 to 5 atmospheres, but there is no advantage to doing so.

TABLE 1

| Run # | Hydrocarbon | Temp. °C. | Air flow cc/min | Carbonized Alumina Product | | |
|---|---|---|---|---|---|---|
| | | | | Area* m$^2$/g | Pore♦ cc/g | Wt. % C |
| 5038♦ | Butadiene | 580 | 30 | 50 | 0.231 | 4.08 |
| 5040 | Butadiene | 580 | 30 | 99 | 0.224 | 3.46 |
| PR-3 | Propane | 700 | 0 | 98 | 0.223 | 3.39 |

TABLE 1-continued

| Run # | Hydrocarbon | Temp. °C. | Air flow cc/min | Carbonized Alumina Product | | |
|---|---|---|---|---|---|---|
| | | | | Area* m$^2$/g | Pore cc/g | Wt. % C |
| PR-7 | Propane | 850 | 15 | 73 | 0.212 | 3.55 |

♦ wt = 36 g, surface area 52.47 m$^2$/g, pore volume 0.242 cc/g
*surface area; ♦ average pore volume Most preferably the surface area and average pore size are also substantially unchanged, that is, there is less than a 5% decrease, but it will be appreciated that when preparing the carbonized alumina in bulk quantities a larger decrease, up to about 10% less than the original, may be obtained.

That the carbon atoms are present in an essentially monomolecular layer is deduced from the following: A carbon atom is about 4 Å in diameter, i.e. $4 \times 10^{-8}$ cm The density of carbon is 2.2 g/cc When alumina having a surface area of 50 m$^2$/g is used, there is $50 \times 10^4$ cm$^2$/g of surface area. To cover the entire surface area with a layer of carbon atoms, one carbon atom thick, the amount of carbon present should be $50 \times 10^4$ cm$^2$/g $\times 4 \times 10^{-8}$ cm $\times 2.2$ g/cm$^3$ = 4.4% by weight carbon based on 100 g of carbonized alumina.

As will be seen from the above data, there is less than a monomolecular layer of carbon present, based on theoretical, but from a practical point of view, it is desired to have a monomolecular layer.

The carbonized alumina so obtained is used to treat a Bayer process liquor stream. The specific stream treated is not narrowly critical in terms of the efficacy of the treatment but it will be evident that most benefit will be reaped from treating the decanted sodium aluminate stream from the separation zone before precipitation of the aluminum hydroxide crystals from the stream.

Figure 3:
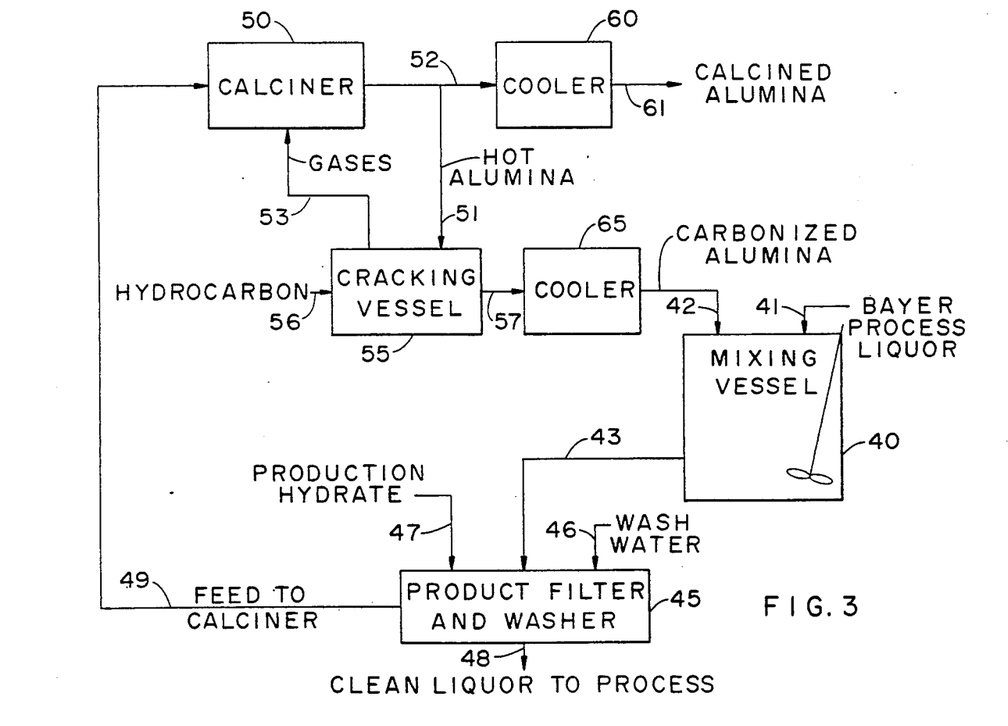
FIG. 3 is a process flowsheet for the removal of organic impurities from Bayer process liquor, and the subsequent destruction of the impurities to recover smelting grade alumina for reuse in the process.

In FIG. 3 there is schematically illustrated a process flowsheet in which a mixing vessel 40 is used for contacting and purifying a Bayer process liquor stream 41, preferably the decanted sodium aluminate stream, or the filtered stream from the Kelly filter. Carbonized alumina 42 is added to the mixing vessel in an amount in the range from about 1 to 10% by wt based on the weight of the liquor in the tank. After thorough agitation for a period in the range from about 0.5 hr to 5 hr, the contents 43 of the tank are flowed to a product filter and washer 45 into which wash water 46 and aluminum hydrate 47 produced in the process are also introduced. The filtrate 48 is purified liquor essentially free from organic impurities which is led to the crystallization zone of the process.

The solid cake 49 from the product filter is fed to a rotary or stationary calciner 50 into which hot gases 53 from the carbonization fluid bed reactor 55 are flowed. The impurities adsorbed in the pores of the carbonized alumina are incinerated in the calciner at a temperature in the range from about 800° C. to about 1500° C., and a portion 51 of the hot, clean alumina is flowed to the reactor 55 to be carbonized, thus minimizing the cost of heat energy to carbonize the alumina. The remaining portion 52 of the hot clean alumina is led to a cooler 60 from which cooled calcined smelting grade alumina 61 is discharged. Hydrocarbon 56 is metered to the reactor 55, and the alumina is carbonized as described hereinabove. The carbonized alumina is cooled in cooler 65 from which it emerges at a temperature low enough to be added to the mixing vessel and maintain a desired temperature therein.

Though active carbon is recognized not to adsorb sodium oxalate, surprisingly, it is found that the oxalate content is substantially diminished. Moreover, because the carbonized alumina is essentially insoluble in hot sodium aluminate solution and is recycled in the process for reuse, a much larger amount of the carbonized alumina may be used to purify the impure process liquor than would otherwise be used, for example, if the adsorbent was activated carbon which is not economically reusable.

A laboratory scale experiment to emulate a portion of the foregoing process is carried out as follows:

A sample of Bayer process liquor taken at different dates from an alumina refining plant (Point Comfort) was used in each of the runs. The samples were pre-filtered to remove precipitated aluminum hydroxide. The analysis for organic matter determined as "organic C", is made by UV-persulfate oxidation method using a Doneona Dohrmann Instrument. The analysis for oxalate is determined by Ion Chromatographic method. The color of each pre-filtered sample was determined visually as being "dark brown" corresponding to a color number of 2.43 on the photometer scale with a Bausch & Lomb Spectronic 2000 Spectrophotometer.

In a test to determine the purification effect of incremental amounts of carbonized alumina, 100 ml of the liquor is placed in a 200 ml polythene bottle and an initial amount (say 2 g) of carbonized alumina is added to the liquor. The bottle is closed to give a tight seal and then shaken in a water bath maintained at a specified temperature (say 60° C.) for about an hour. After being shaken for a total of 4 hr, the liquor is filtered to remove the carbonized alumina contaminated with adsorbed impurities. The filtrate is analyzed for color, and organic carbon.

Additional 100 ml portions of the same liquor are mixed with 4 g, 6 g, 8 g and 10 g respectively, of carbonized alumina and placed in the bath. The initial oxalate content of the liquor in each of the portions is the same, 1.86 g/L. The organic carbon content (other than oxalate) and color was measured at the end of the 4 hr period during which the samples were agitated. The oxalate content of the treated liquor samples was not measured. The results are given in the following Table 2.

TABLE 2

| Sample No. | Initial Liquor | | Alumina gm/liter | Treated Liquor | |
|---|---|---|---|---|---|
| | organic C * | color ♦ | | organic C * | color ♦ |
| 1 | 9.4 | 2.43 | 20 | 9.4 | 2.36 |
| 2 | 9.4 | 2.43 | 40 | 9.0 | 2.28 |
| 3 | 9.4 | 2.43 | 60 | 8.9 | 2.14 |
| 4 | 9.4 | 2.43 | 80 | 8.5 | 1.99 |
| 5 | 9.4 | 2.43 | 100 | 8.3 | 1.80 |

* organic carbon is given in gms/liter
Color No. is the light absorption value at 435 nm.

Figure 4:
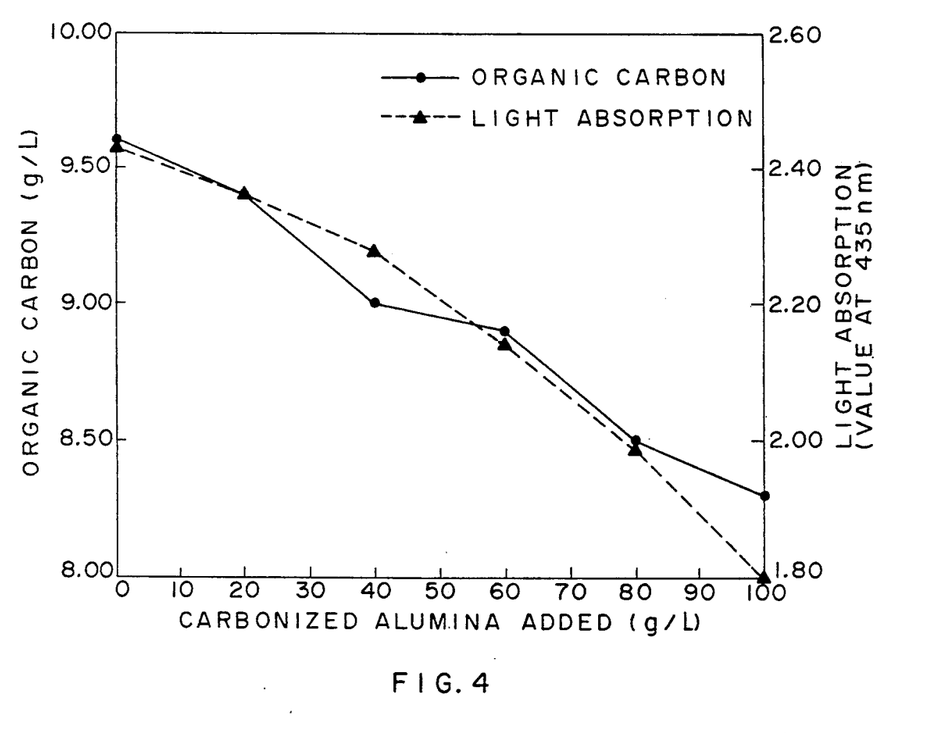
FIG. 4 is a graph plotting organic carbon, and light absorption (at 435 nm), as a function of the amount of carbonized alumina used.

The foregoing data is plotted in FIG. 4. As will be evident from the foregoing data, the depletion of organic carbon (plotted along the Y-axis) increases with increasing amounts of carbonized alumina (plotted along the X-axis). The effectiveness of the removal of impurities is also measured by the decrease of color which is measured by light absorption (also plotted along the Y-axis, but on the right).

The removal of oxalate impurity from the Bayer liquor is illustrated by the following example in which oxalate-contaminated and colored Bayer liquor was shaken with carbonized alumina for 4 hr:

| | Initial Liquor | | | Treated Liquor | |
|---|---|---|---|---|---|
| Run # | organic C gm/liter | Sod. oxal. gm/liter | Carb'z'd alumina gm/liter | organic C gm/liter | Sod. oxal gm/liter |
| 6 | 9.2 | 1.95 | 90 | 8.2 | 0.76 |

The "spent" alumina was recovered from the mixture on filter paper by filtration, and washed with deionized water using 10 ml/gm of alumina. Samples of both virgin carbonized alumina and the spent alumina were heated to 1000° C. for 2 hr in an electric furnace in the presence of oxygen, to calcine the samples. Each sample was converted to a snow white alumina product, and each was analyzed for $Na_2O$ content. The analysis showed the following:

| After calcining | Percent $Na_2O$ present |
|---|---|
| Virgin carbonized alumina | 0.490 |
| Spent carbonized alumina | 0.504 |

It is evident that there is only a 0.014% increase in the concentration of $Na_2O$. This increase is deemed to be so small as to be substantially unchanged and insignificant.

To compare the effectiveness of uncarbonized smelting grade alumina with that of the hybrid adsorbent, the following test was conducted: 100 mls of the Bayer liquor was mixed with 10 g of uncarbonized smelting grade alumina and shaken in a water bath held at 50° C. for 4 hr. This amount of 100 g alumina per liter of liquor corresponds to the highest amount tested as reported in Table 2, above, because it was expected to give the best adsorption. At the end of this period, the alumina was separated by filtration, and the filtrate collected. There was essentially no visually observable difference between the filtrate and the untreated liquor, indicating that the uncarbonized alumina had no observable effect. A measurement of the color with the spectrophotometer showed essentially no difference (within experimental error) between the filtrate and the untreated liquor.

To compare the effectiveness of granular activated carbon with that of the hybrid adsorbent, the following test was conducted: 100 mls of the Bayer liquor was mixed with 0.5 g of granular activated carbon (Type CAL produced by Calgon Carbon Corp.) and shaken in a water bath held at 50° C. for 4 hr. This amount of 5 g carbon per liter of liquor is greater than the highest amount of carbon which may be deposited in the hybrid adsorbent. At the end of this period, the activated carbon was separated by filtration, and the filtrate collected. There was essentially no visually observable difference between the filtrate and the untreated liquor, indicating that the amount of activated carbon used was too low to have a visually observable effect. A measurement of the color with the spectrophotometer showed essentially no difference (within experimental error) between the filtrate and the untreated liquor.

Having thus provided a general discussion, described the overall process in detail and illustrated the invention with specific examples of the best mode of carrying out the process, it will be evident that the invention has provided an effective solution to an age-old problem. It is therefore to be understood that no undue restrictions are to be imposed by reason of the specific embodiments illustrated and discussed, except as provided by the following claims.

We claim:

1. A process for controlling the concentration of organic impurities including color-forming impurities and sodium oxalate in process liquor generated in the Bayer process for the production of crystalline aluminum hydroxide, said method comprising,
   (a) contacting the process liquor for a time sufficient to adsorb sodium oxalate and a major proportion by weight of said impurities, at a temperature in the range from about 20° C. to about 100° C., with from 5 percent to about 30 percent by weight (based on 100 parts of liquor), of an essentially anhydrous carbonized alumina having a surface area (measured by BET $N_2$ adsorption) in the range from 25-250 $m^2/g$, and a pore volume in the range from about 0.1 cc/g to 1 cc/g, said alumina having deposited thereupon carbon atoms in an essentially unbroken monomolecular layer less than about 10 Å thick, containing essentially no volatile matter;
   (b) separating contaminated carbonized alumina from said process liquor treated in the prior step, to yield purified process liquor;
   (c) precipitating desirably white crystalline aluminum hydroxide from said purified process liquor;
   (d) directing said contaminated alumina from step (b) to a calcination zone in which organic impurities are oxidized to dischargeable waste products; and,
   (e) recovering calcined porous alumina from said calcination zone.

2. The process of claim 1 wherein said alumina has a loss on ignition of less than 1.0%, average pore size in the range from 20 Å to 250 Å, and said surface area remains substantially unchanged after carbonization of said alumina.

3. The process of claim 2 wherein said process liquor is sodium aluminate having a specific gravity in the range from 1.1 to 1.5.

4. The process of claim 2 wherein said carbonized alumina is used in step (a) in an amount in the range from 10 percent to 20 percent by weight of said process liquor stream.

5. The process of claim 2 wherein the concentration of sodium, measured as sodium oxide, in said calcined porous alumina is substantially unchanged.

6. A method for adsorbing organic impurities including color-forming impurities and sodium oxalate in process liquor generated in the Bayer process for the production of crystalline aluminum hydroxide, said method comprising,
   (a) contacting the process liquor for a time sufficient to adsorb a major proportion by weight of said impurities, at a temperature in the range from about 20° C. to about 100° C., with a particulate mass of essentially anhydrous carbonized alumina in an amount from 5 percent to about 30 percent by weight (based on 100 parts of liquor), particles of said carbonized alumina being coated with carbon atoms in an essentially unbroken monomolecular layer which fails to substantially decrease the pore volume of said alumina compared to its pore volume before it is coated with said carbon; said particles after being coated, having a surface area (measured by BET $N_2$ adsorption) in the range from 25-250 $m^2/g$, a pore volume in the range from about 0.1 cc/g to 1 cc/g, and essentially no volatile matter;
   (b) maintaining a mixture of said process liquor and particles in contact for a period of time sufficient to adsorb a major portion by weight of said impurities upon the surface area of said particles;
   (c) separating "spent" carbonized alumina from said mixture; and,
   (d) recovering purified process liquor.

7. The method of claim 6 including precipitating desirably white crystalline aluminum hydroxide from said purified process liquor.

8. The method of claim 6 including heating said "spent" carbonized alumina at a temperature in the range from about 800° C. to about 1500° C. for a period of time sufficient to calcine said alumina, and, recovering calcined alumina essentially indistinguishable from virgin alumina product.

* * * * *

UNITED STATES PATENT AND TRADEMARK OFFICE
CERTIFICATE OF CORRECTION

PATENT NO. : 5,093,092
DATED : March 3, 1992
INVENTOR(S) : Chanakya Misra and Joseph R. Genito It is certified that error appears in the above-identified patent and that said Letters Patent is hereby corrected as shown below:

Title page, item [54] and col. 1, line 2, change "OR" to --OF--.

Col. 9, line 57    Before "Color", insert --◆--.

Col. 12, line 12    After "adsorb", insert --sodium oxalate and--.
Claim 6

Signed and Sealed this

Third Day of August, 1993

Attest:

MICHAEL K. KIRK

*Attesting Officer*    Acting Commissioner of Patents and Trademarks